(12) United States Patent
Geary

(10) Patent No.: US 11,154,993 B2
(45) Date of Patent: Oct. 26, 2021

(54) TOOL CHANGER

(71) Applicant: Delaware Capital Formation, Inc., Wilmington, DE (US)

(72) Inventor: James W. Geary, Pawcatuck, CT (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 16/710,425

(22) Filed: Dec. 11, 2019

(65) Prior Publication Data

US 2021/0178608 A1    Jun. 17, 2021

(51) Int. Cl.
*B25J 15/04*    (2006.01)
*B23Q 3/155*    (2006.01)

(52) U.S. Cl.
CPC ........ *B25J 15/0433* (2013.01); *B23Q 3/1554* (2013.01); *B25J 15/0491* (2013.01); *Y10S 483/901* (2013.01); *Y10S 901/41* (2013.01); *Y10T 403/7073* (2015.01)

(58) Field of Classification Search
CPC ............... B25J 15/0408; B25J 15/0425; B25J 15/0433; B25J 15/0491; Y10S 483/901; Y10S 901/30; Y10S 901/36; Y10S 901/41; Y10T 403/7073
USPC ................ 901/30, 36, 41; 483/901; 403/375
See application file for complete search history.

(56) References Cited

U.S. PATENT DOCUMENTS

| | | |
|---|---|---|
| 3,664,588 A | 5/1972 | Newell et al. |
| 4,317,427 A | 3/1982 | Turner |
| 4,479,673 A | 10/1984 | Inaba et al. |
| 4,530,636 A | 7/1985 | Inaba et al. |
| 4,637,121 A | 1/1987 | Wortmann |
| 4,664,588 A | 5/1987 | Newell et al. |
| 4,685,687 A | 8/1987 | Hall et al. |
| 4,875,275 A * | 10/1989 | Hutchinson ........... B23B 31/113 279/93 |

(Continued)

FOREIGN PATENT DOCUMENTS

| | | | | |
|---|---|---|---|---|
| GB | 2292365 A | * | 2/1996 | ......... B25J 15/0491 |
| JP | S61-265290 A | | 11/1986 | |

(Continued)

OTHER PUBLICATIONS

European Search Report dated May 21, 2021 in corresponding European Application No. 20211804.8.

*Primary Examiner* — Erica E Cadugan
*Assistant Examiner* — Michael Vitale
(74) *Attorney, Agent, or Firm* — Harness, Dickey & Pierce, P.L.C.

(57) ABSTRACT

A tool changer 30 with a master half 32 and tool half 34. Mating member 60, 138 enables the master half 32 and tool half to mesh with one another. A securing mechanism has a clasp 70 and a cam 72. The clasps 70 move between a release position and a grasping position. In the grasping position, the master 32 and tool halves 34 are secured together with one another. The cam 72 moves the clasps 70 between the release and grasping positions. From a release position, the master half 32 engages the tool half 34. The master half 32 moves horizontally with respect to the tool half 34. This, in turn, moves the cam 72 from its release position to its grasping position. In the grasping position, the clasps 70 grasp the tool half 34, the cam locks 72 in its grasping position and the master 32 and tool 34 halves secure with one another.

16 Claims, 10 Drawing Sheets

(56) References Cited

U.S. PATENT DOCUMENTS

| | | | |
|---|---|---|---|
| 4,944,629 A | | 7/1990 | Peveto |
| 4,980,963 A | * | 1/1991 | Dinse ................ B23K 9/282 |
| | | | 279/46.7 |
| 5,044,063 A | | 9/1991 | Voellmer |
| 5,219,318 A | | 6/1993 | Vranish |
| 5,261,758 A | | 11/1993 | Vranish |
| 5,320,395 A | | 6/1994 | Gernhardt et al. |
| 5,372,567 A | * | 12/1994 | Whittington ........ B23Q 1/0009 |
| | | | 219/86.8 |
| 5,848,795 A | | 12/1998 | Masatsugu et al. |
| 6,612,589 B2 | | 9/2003 | Saito |
| 7,794,171 B2 | | 9/2010 | Park et al. |
| 8,221,296 B2 | | 7/2012 | Hildebrandt et al. |
| 8,360,377 B2 | * | 1/2013 | Geyer ................ B23Q 3/15553 |
| | | | 248/309.1 |
| 8,545,374 B2 | | 10/2013 | Van de Vosse et al. |
| 8,857,821 B2 | | 10/2014 | Norton et al. |
| 2010/0062919 A1 | * | 3/2010 | Norton ................ B25J 15/04 |
| | | | 483/55 |
| 2014/0363223 A1 | * | 12/2014 | Goto ................ B25J 15/0408 |
| | | | 403/326 |
| 2018/0304475 A1 | * | 10/2018 | Zachary ............ B25J 15/0416 |

FOREIGN PATENT DOCUMENTS

| | | | | |
|---|---|---|---|---|
| JP | H05-169383 A | | 7/1993 | |
| JP | 2014-188616 A | | 10/2014 | |
| WO | WO-2015074710 A1 | * | 5/2015 | .......... B25J 15/0491 |

* cited by examiner

TOOL CHANGER

FIELD

The present disclosure relates to robotic tools and, more particularly, to a tool changer coupling tools with a robot.

BACKGROUND

Turning to FIGS. 12 and 13, a state of the art tool changer is illustrated. The tool changer includes the robot 10, master half 12, tool half 14 and tool 16. The master half 12 includes a piston 18 operated via pneumatic or hydraulic power. A locking body 20 is coupled with the piston. A ball cone 22 is secured with the piston rod. The balls 24 are outside of the cone 22. The tool half 14 includes a ball ring 26 to receive the balls 24 to lock the two halves together.

The master 12 and tool 14 halves come together. The piston 18 is actuated which drives down the cone 22. The cone 22 pushes the balls 24 radially outward through the locking body. The balls 24 engage with the ball ring 26 in the tool half. The tapered angles of the cone 22 and ball ring 26 pull the master 12 and tool 14 halves tightly together. In this design, should pressure be lost, a detent in the cone 22 would keep the tool 16 from dropping out accidentally.

In this design, it locks in the center of the tool changer with the expanding ball connection between the tool and master halves being driven by an air cylinder. This requires the locking mechanism to be located in the center of the device. Between the size of the air cylinder and locking features of both halves, the tool changers tend to be quite tall. This added height diminishes the moment carrying capability of the robot by this increased length. The weight of the tool changer reduces the effective payload and moment capacity of the robot.

In addition, the locking located at the center has less capability to resist the moment. This is due to a shorter moment arm generated by the robot's payload to resist the loading applied by the robot to the tooling via the tool changer. This results in a lack of stiffness in the tool changer that enables effector tooling to deflect (sag) more easily, reducing the tool effectiveness.

The size of the tool changer is also effected by the lack of stiffness of the locking balls. This is due to the fact that they are poorly located in the center and mate via point contact between the master and tool halves. This causes high stresses that can cause brinelling of the balls and mating couplers. In addition, the point contact also does not resist deflection effectively.

Some manufacturers have tried to increase the contact area with contour ball sockets. Others have tried with expanding micro wedges to increase the contact area. Regardless, even with greater contact area, the point of application is near the center of the device. Thus, this inherently lacks stiffness.

Further, most robotic tool changers require a custom adapter plate to mount the tool changer to the desired robot. This adapter adds costs, weight and height to the assembled and mounted tool changer. This exacerbates the previously mentioned problems.

Further, these alleged all automatic changers utilize pneumatic air cylinders in the master half to lock and unlock the robot to the tool. Many different types of so called fail safe designs exists. If air pressure is lost, due to a broken air hose or the like, the master half does not let go of the tool. These fail safe designs consist of springs and detents that are effective if air pressure is lost. However, it does not protect from programming signal errors that switches the value to unlock the tooling and thus drop the tool.

The inherent problem with this arrangement is that it is possible and quite common for a robot programming error to happen. This causes pneumatic lock/unlock valves to actuate unexpectedly. This, in turn, decouples the tool half from the master half. This may lead to an expensive tool being destroyed due to dropping the tool from the robot. This functional problem is inherent in nearly all tool changers on the market today.

Additionally, there are many applications where the tool changing is done by a human operator. No current designs can operate as both a manual tool changer and an automatic one. There are circumstances where, if a tool changer pneumatic piston seal leaks, it is impossible to open due to failsafe devices mentioned above. In situations like this, the tool changer must literally be cut off of the robot as mounting screws are inaccessible when the two halves are coupled and locked.

SUMMARY

Accordingly, it is an objection of the disclosure to overcome the problems of the above art. The present tool changer includes a master half and a tool half that are connected (coupled and locked), via deliberate program motion of the robot rather than an pneumatic air cylinder in the master half. The motion causes the robot to lock and unlock the tool halves. This is achieved only when the tool is safely positioned in a nest. The nest functions like a key to lock and unlock the device. Additionally, the tool changer can be unlocked when it is out the nest with human intervention.

According to a first aspect of the disclosure, a tool changer comprises a master half and a tool half. The master half is coupled with a robot. The tool half is coupled with a tool. A first mating member is on the master half. A second mating member is on the tool half. The first and second mating members include a recess or a projection, respectively, to enable the first and second mating members to mesh (mate) with one another defining an accurate and repeatable positioning between the master and tool. This interface also resists lateral and torsional forces between the two. A securing mechanism secures the master and tool halves with one another. The securing mechanism includes a clasp and a cam. The clasp moves between a release position and a grasping position. In the grasping position, the master and tool halves are secured together with one another. The cam moves the clasp between the release and grasping positions. A lock pin locks the cam in the release and grasping positions. From a release position, the master half engages the tool half. The lock pin moves to an unlocked position. The master half moves horizontally with the tool half. This, in turn, moves the cam from its release position to its grasping position. In the grasping position, the clasp grasp the tool half. The lock pin moves into a locked position locking the cam in its grasping position. When the master and tool halves are unsecured with one another, the tool half is retained in a nest. The nest includes a member to actuate the lock pin. The tool half includes posts to couple with the nest. The securing mechanism includes a plurality of clasps. Each clasp has a jaw and a pin. The pin is received in a corresponding slot in a cam plate of the cam. Movement of the cam plate moves the clasp pin in the slot moving the clasp between its released and grasping positions. In the grasping position, the jaw engages a shoulder to secure the master and tool halves together. The tool half includes a slot to enable passage of the lock pin.

According to a second aspect of the present disclosure, a tool changing system comprises a robot with a tool changer and at least one nest to support a tool. The tool changer further comprises a master half and a tool half. The master half is coupled with a robot. The tool half is coupled with a tool. Mating members couple the halves together. The mating members include a recess or a projection, respectively, to enable the mating members to mesh (mate) with one another. A securing mechanism secures the halves with one another. The securing mechanism includes a clasp and a cam. The clasp moves between a release position and a grasping position. In the grasping position, the halves are secured together with one another. The cam moves the clasp between the release and grasping positions. The robot moves the master half horizontally with respect to the tool half. This, in turn, moves the cam from its release position to its grasping position. In the grasping position, the clasp grasped the tool half. When the master and tool halves are unsecured with one another, the tool half is retained in a nest. The nest includes a member to actuate the lock pin. The tool half includes a post to couple with the nest. The securing mechanism includes a plurality of clasps. The clasp have a jaw and a pin. The pin is received in a corresponding slot in a cam plate of the cam. Movement of the cam plate moves the clasp pin in the slot moving the clasp between its released and grasping positions. In the grasping position, the jaw engages a shoulder securing the halves together.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
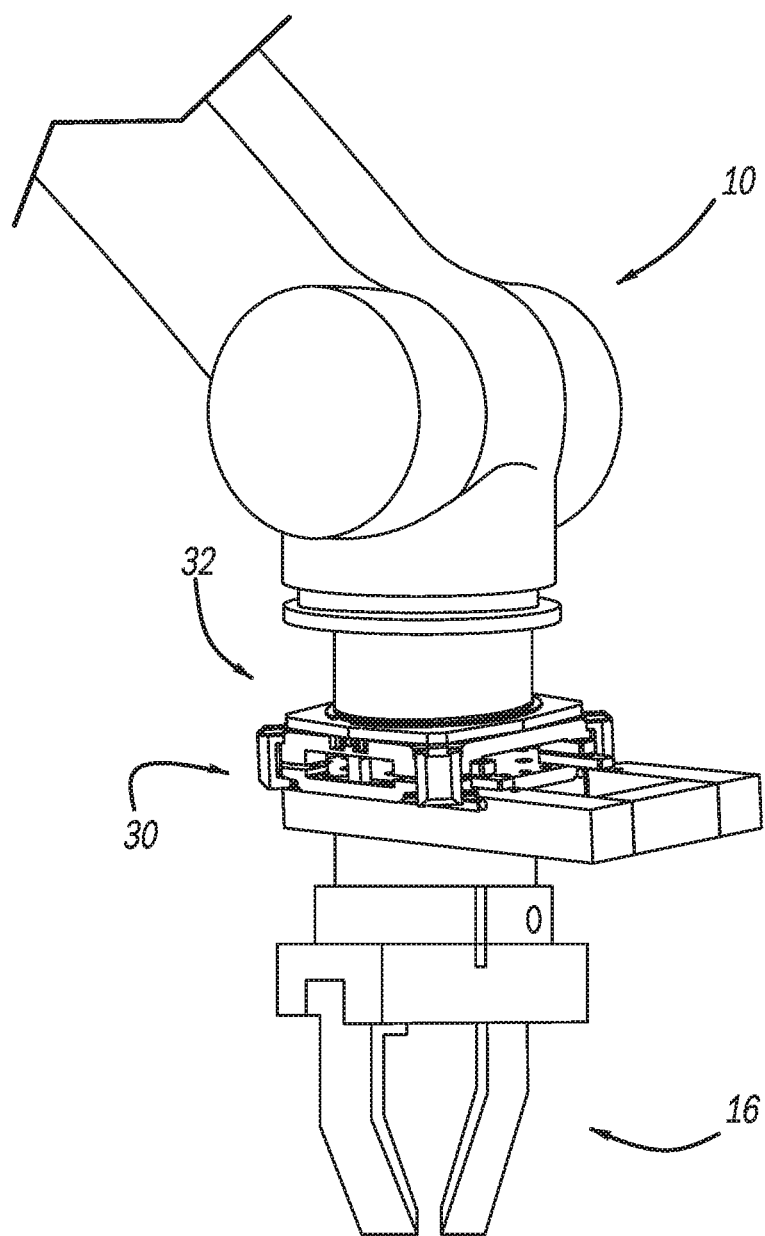
FIG. 1 is a perspective view of a robot arm with a tool changer according to the disclosure.
Figure 2:
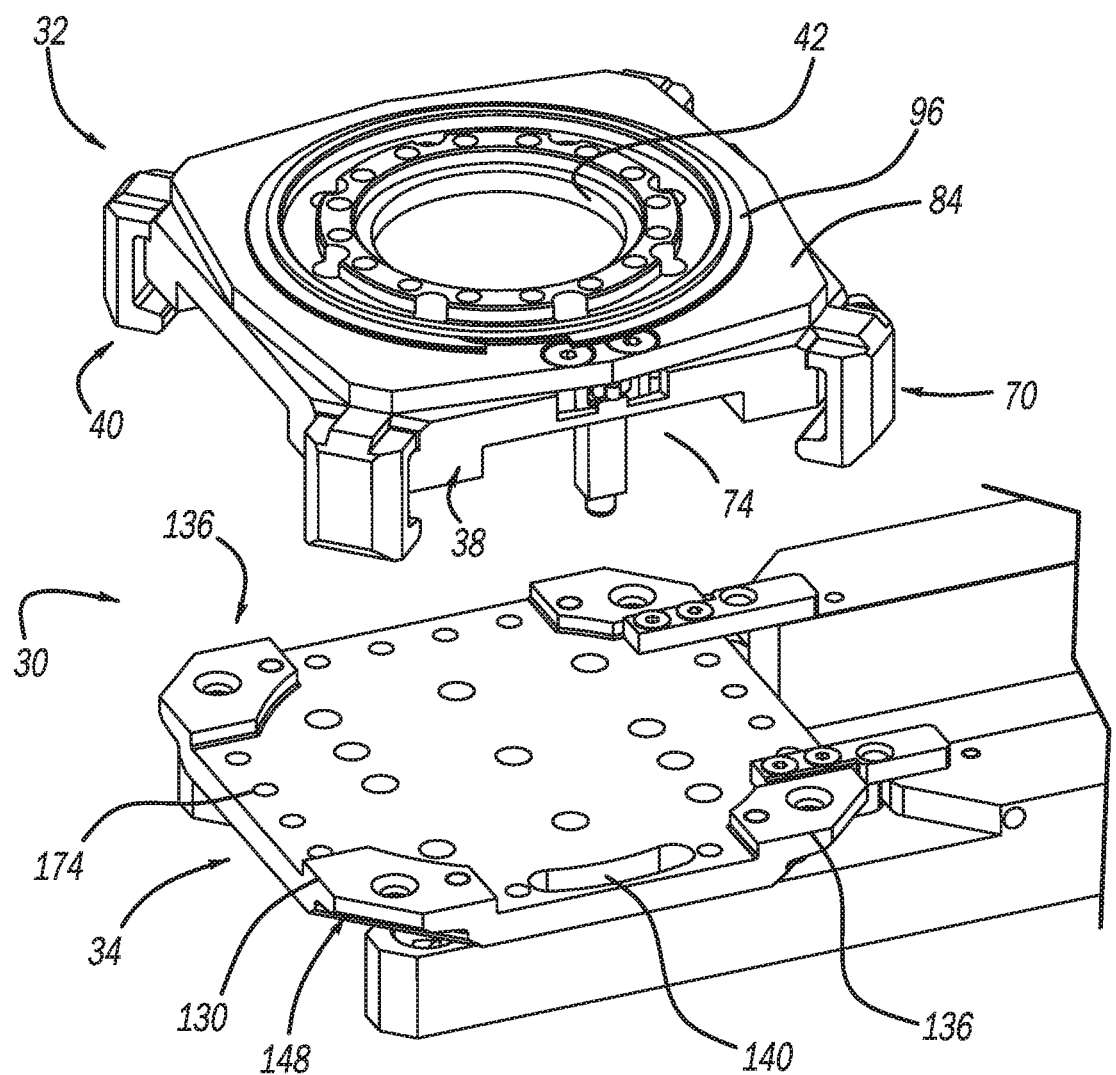
FIG. 2 is a perspective view of the tool changer itself.
Figure 3:
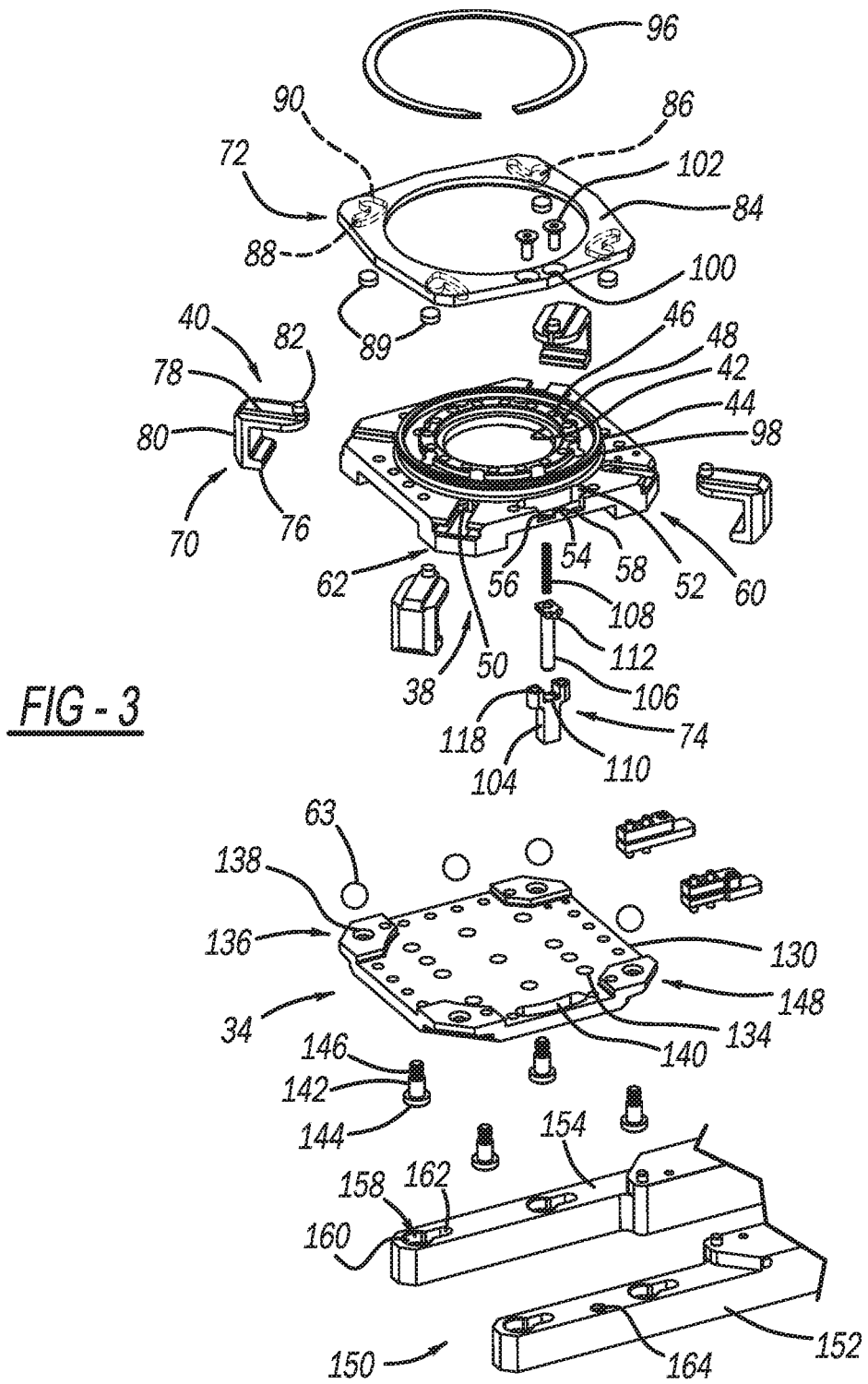
FIG. 3 is a exploded perspective view of FIG. 2.
Figure 4:
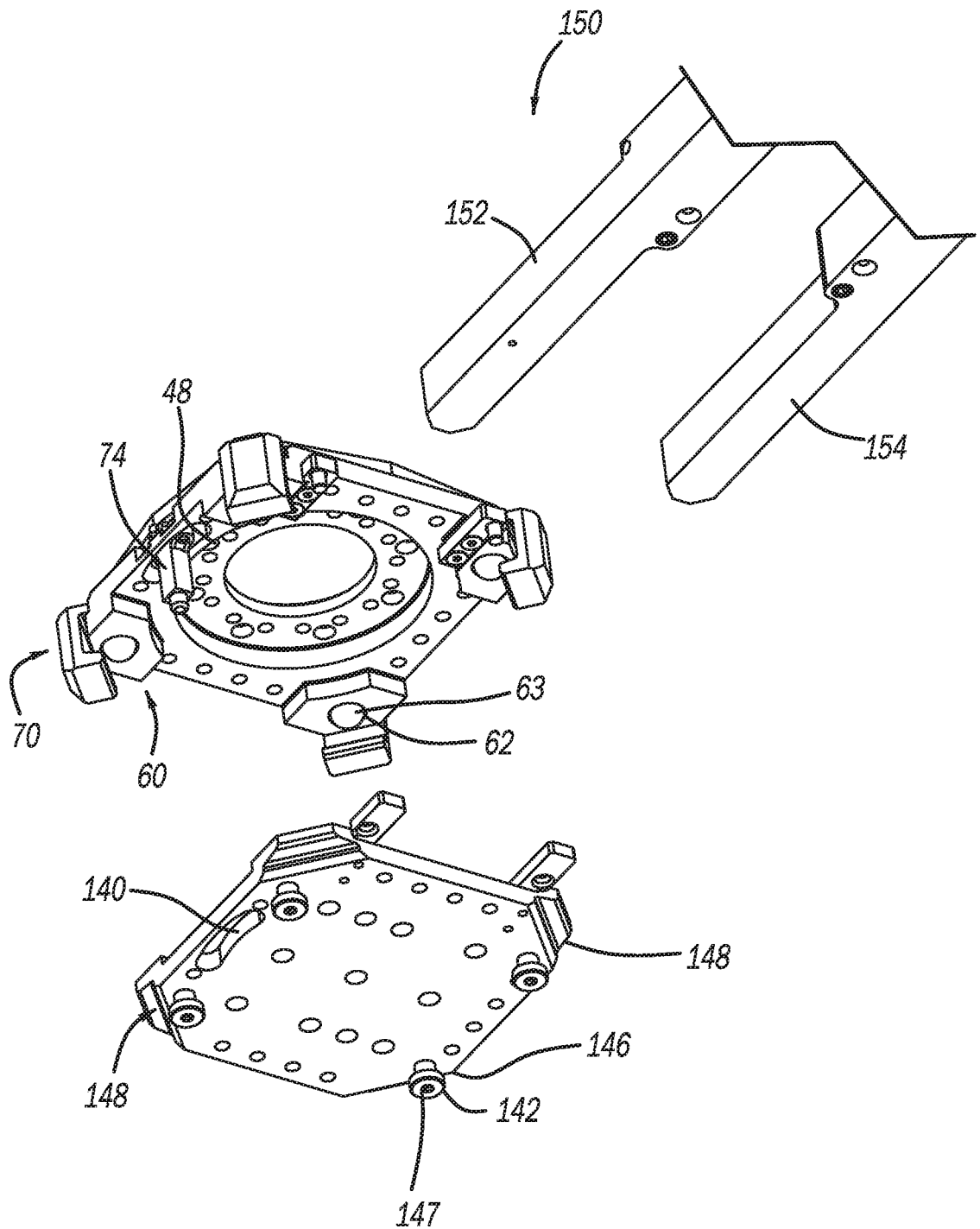
FIG. 4 is a bottom perspective view of the tool half.

Turning to the figures, a tool changer is illustrated on a robot arm 10 and designated with the reference numeral 30. The tool changer 30 includes a master half 32 and a tool half 34. The master half 32 is coupled with the robot 10 and the tool half 32 is coupled with a tool 16.

The master half 32 includes a body 38 and a securement assembly 40. The securement assembly 40 enables the master half 32 to be coupled and decoupled with a tool half 34.

The body 38 has an overall rectangular and almost square configuration. The body 38 is plate shaped and includes a central aperture 42 with a projecting annular boss 44. An additional annular boss 46 is positioned inside of the boss 44. The boss 46 includes a plurality of apertures 48 to enable securement of the master half 32 with the robot 10. Fasteners pass through the apertures 48 for securement.

The body 38 includes T-shaped slots 50 on its corners. The T-shaped slots 50 receive clasps 70 defined herein. The body 38 includes a channel 52 to enable passage of a pin lock 74. The channel 52 includes a front wall 54 that includes a pair of cutouts 56, 58. The body side opposite to the T-shaped slots 50 includes a mating member 60. The mating member 60 may include a bore or recess 62 and ball 63 to enable the mating members 60 to mesh or mate with mating members on the tool half 34.

The securing mechanism 40 includes one or more clasps 70 coupled with a cam 72 activated by the lock pin 74. The clasps 70 have an overall C-shape with legs 76, 78 separated by web 80. The leg 78 is longer than the leg 76 and includes a cam pin 82. The leg 78 has an overall T-shaped in cross-section to be received in the T-slot 50. Thus, the leg 78, of the clasp 70, slides in the T-slot 50 on the body 38.

The cam 72 includes a cam plate 84 with one or more cam slots 86 receiving cam pins 82. The slots 86 include a first portion 88 and a second portion 90. The first 88 and second 90 portions are positioned with respect to one another at a desired angle. Elastomeric members 89 are located in the second portion 90 of the slots 86. The elastomeric members 89 push the clasp 70 into its secured position. Also, the elastomeric members 89 take up play in the mechanism to maintain a constant force on the cam pins 82 due to wear. A retaining ring 96 is positioned on the cam plate 84. The retaining ring 96 is received in a groove 98 on the boss 44 to retain the cam plate 84 onto the master half 32.

The cam plate 84 includes apertures 100 that receives fasteners 102 that secure the lock pin 74 with the cam plate 84. The lock pin 74 is received in the channel 52. The lock pin 74 includes a housing 104, pin 106 and a spring 108. The housing 104 includes a bore 110 that receives the pin 106.

The pin 106 includes a detent 112 that prohibits the pin 106 from exiting housing 104. The spring biases the pin 106 between the cam plate 84 and housing 104. The detent 112 is received in a slot in wall 54. The detent 112 is positioned in the cutouts 56, 58 in a locked and unlocked position, as will be explained herein. The housing 104 moves within the channel 52, horizontally, with respect to the body 38. The housing 104 includes bores 118 that receives fasteners 102 that secure the lock pin 74 with the cam plate 84.

The tool half 34 includes a body 130 having an overall plate shape. The body 130 includes apertures 134 to secure the tool 16 with the tool half 34. Also, apertures 174 enable utility modules to be mounted on the tool. At least one mating member 136, four are shown, is positioned on the body 130. The mating member 136 includes a recess 138 to receive the ball 63 from the master half mating member 60. Thus, the recesses 62, 138 are on both of the master 32 or tool halves 34.

An elongated slot 140 is formed in the body 130. The slot 140 receives the pin housing 104 enabling the housing 104 to move horizontally with respect to the body 130. The opposite side of the body 130 includes one or more posts 142. The posts 142 include a head 144 and a neck 146. The neck 146 secures with the body 130. Additionally, the body 130 includes shoulders 148 at its corners to receive the clasps 70 as will be explained herein. The posts 142 secure with the nest 150.

The nest 150 is U-shaped with legs 152, 154 separated by a web. The legs 152, 154 include one or more channels 158. The channels 158 include an opening 160 to receive the head 144 of the posts 142. The channels 158 also include an elongated slot 162 coupled with the opening 160. The slot 162 receives the neck 146 of the post 142. Thus, the posts 142 are positioned within the channels 158 through opening 160. The post 142 is slid in the elongated slot 162 so that the head 144 is in the channel 158 to retain the tool half 34 on the nest 150. The leg 152 includes a bore 164. The bore 164 receives the pin 106 of the lock pin 74.

Coupling and decoupling of the master half 32 and tool half 34 occurs as follows.

Figure 7:
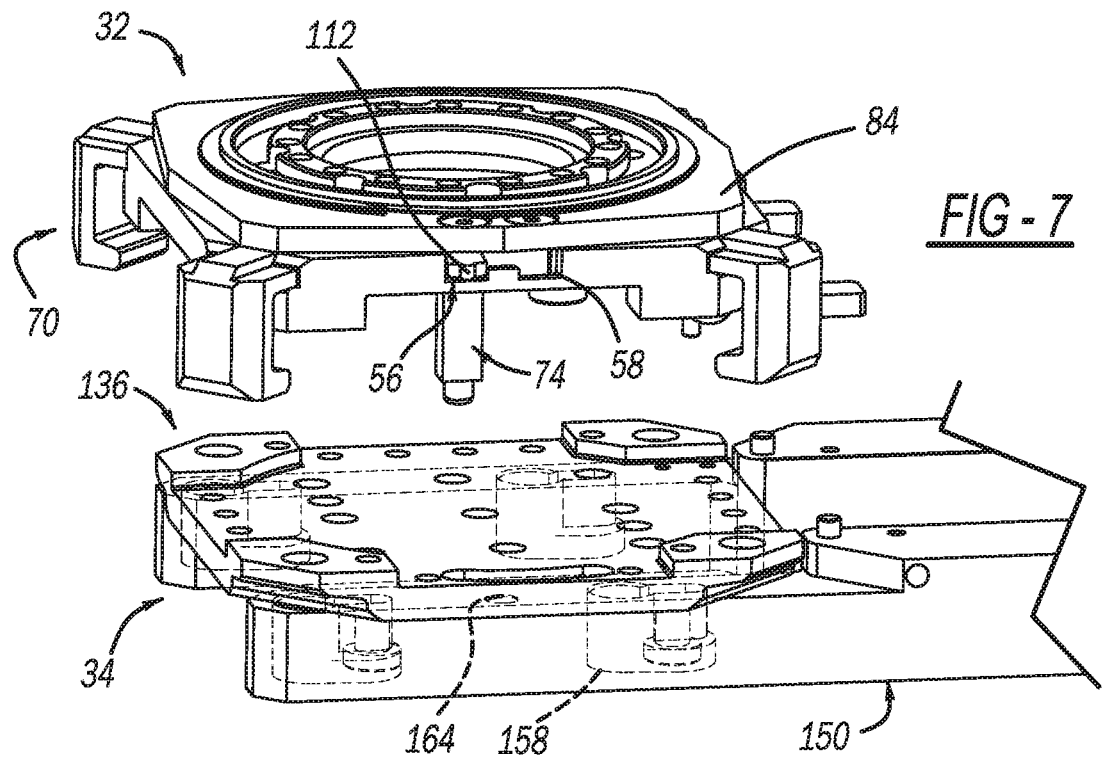
FIG. 7 is a perspective view of the halves decoupled.

Turning to FIG. 7, the master half 32 is positioned away from the tool half 34. This is the uncoupled position. Here, the clasps 70 are positioned in a release position away from the body 38. The pin detent 116 is received in cutout 56. Thus, the clasps 70 are locked in the release position.

Figure 8:
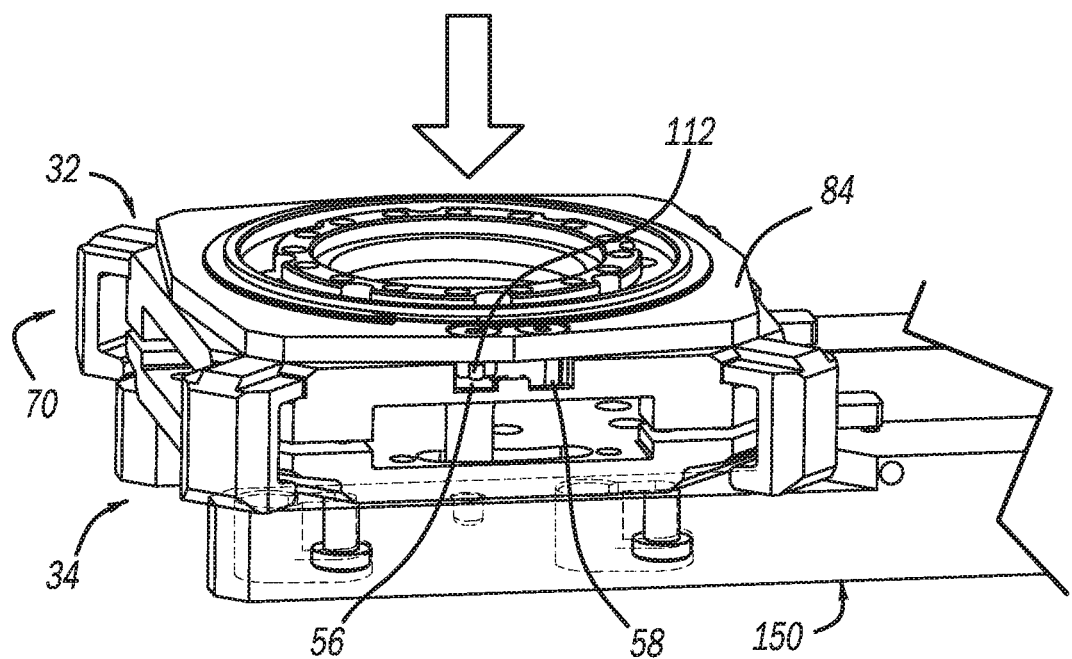
FIG. 8 is a perspective view beginning the coupling process.

Turning to FIG. 8, the robot 10 moves the master half 32 into contact with the tool half 34. The tool half 34 seats in the nest 150. As the halves 32, 34 come together, the pin 106 contacts the bottom of the bore 164. This pushes the pin 106 against the spring 108 out of the cutout 56. The tool half 34 is retained on the nest 150 in the channels 158. The posts 142 are positioned in the channels 158 such that the heads 144 cannot be removed from the opening 160.

Figure 5A:
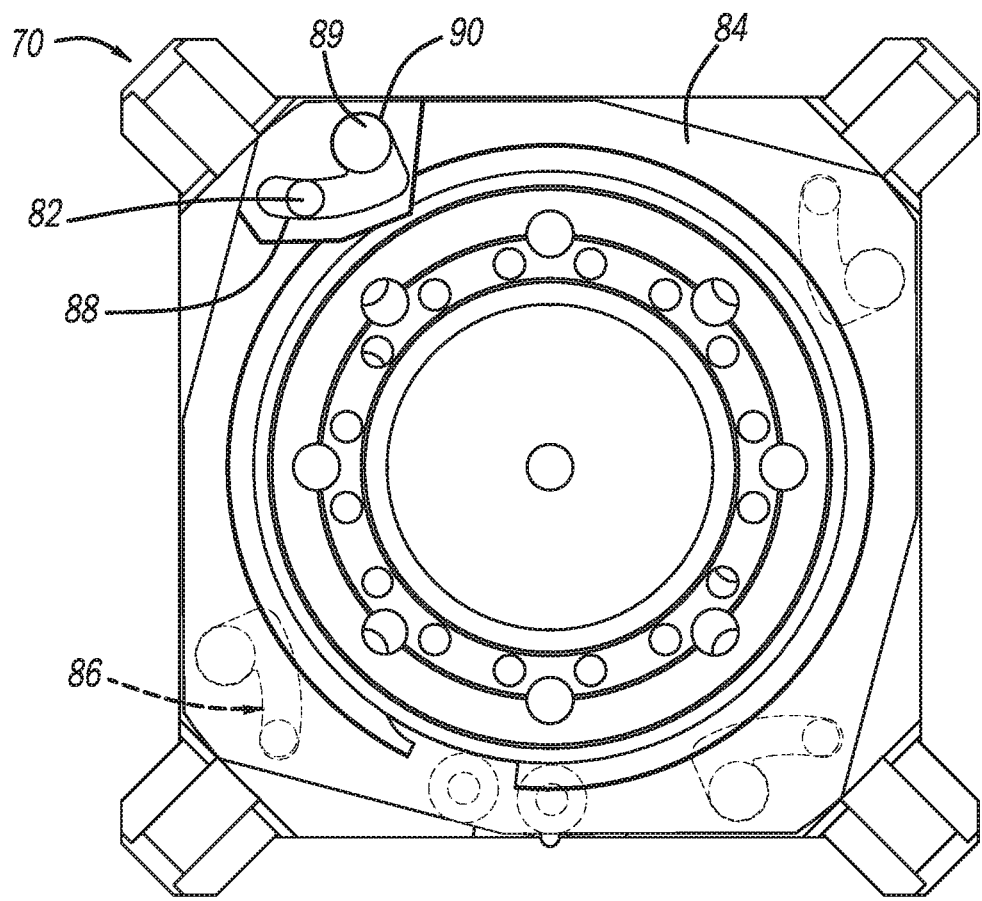
FIG. 5A is a cross-section view of the clasp in a released position.
Figure 5B:
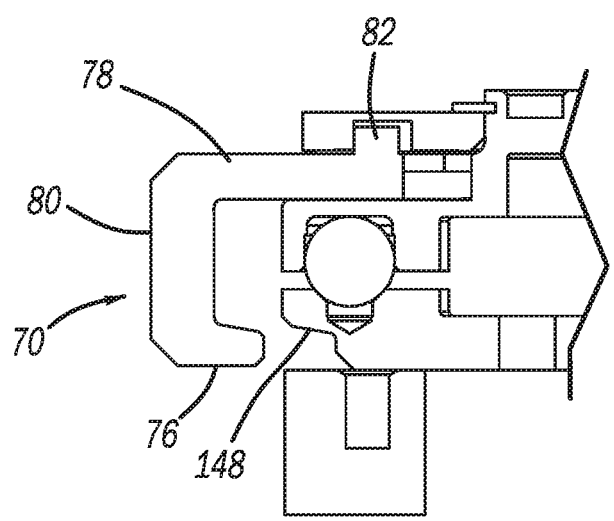
FIG. 5B is a top plan view of the master tool half with the clasp in a released position

FIG. 5A illustrate the clasps 70 with respect to the master half 32 and tool half 34. FIG. 5B illustrates the release position of the cam plate 84 when the clasps 70 are in their released position.

Figure 6A:
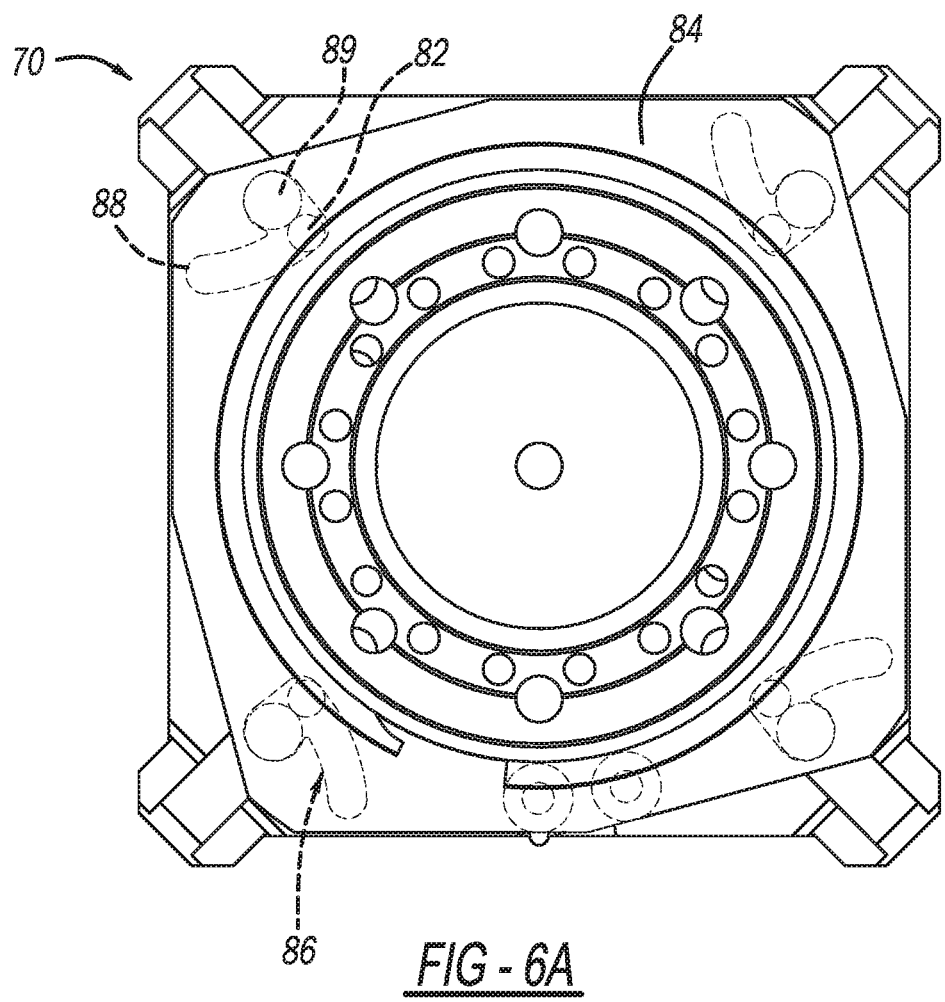
FIG. 6A is a cross-section view of the clasp in a grasping position.
Figure 6B:
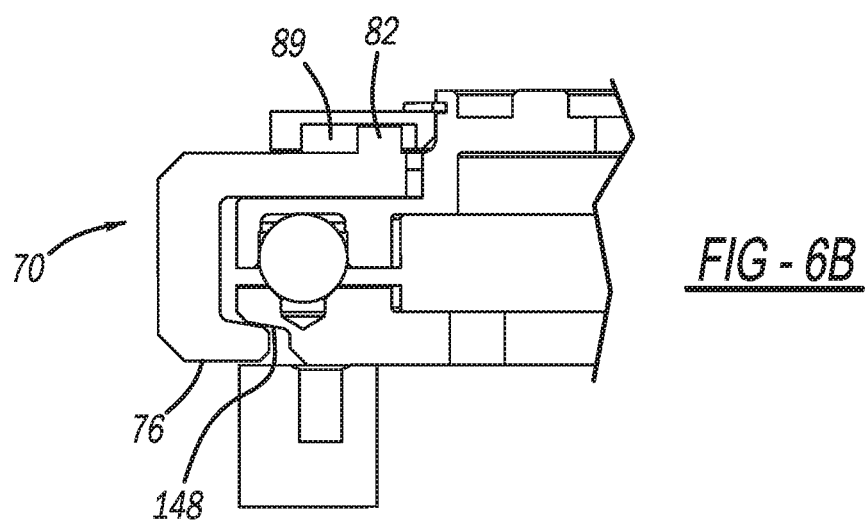
FIG. 6B is a top plan view like that of FIG. 5B with the clasp in a grasping position.
Figure 9:
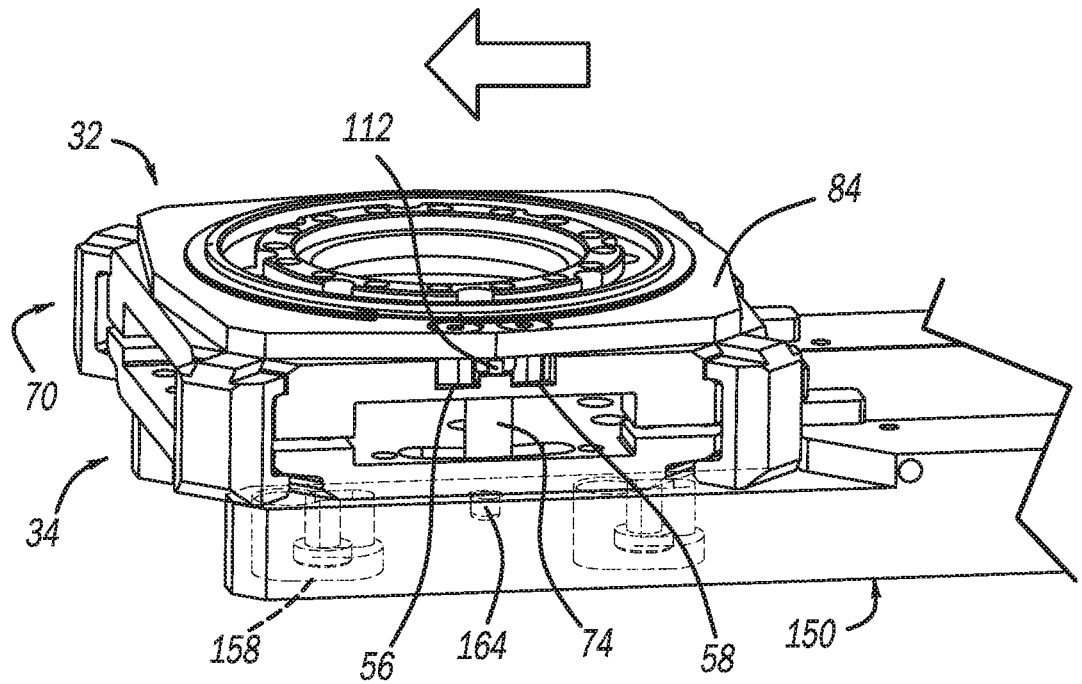
FIG. 9 is a perspective view like FIG. 8 continuing the coupling process.

FIG. 9 illustrates the robot moving the master half 32 horizontally with the tool half 34. As this occurs, the pin 106 contacts walls of the hole 164. This enables the lock pin 74, secured with the cam plate 84, to pivot or rotate the cam plate 84. As this occurs, the pins 82 slide in the slots 86. As the cam plate 84 moves the pins 82 in the slots 86, the clasps 70 move into a grasping position as illustrated in FIG. 6A. Here, the leg 76 is received in the shoulder 148 securing or locking the master half 32 with the tool half 34. FIG. 6B illustrates the grasping position of the cam plate 84 with the clasps 70 in the grasping position as illustrated in FIG. 6A.

Figure 10:
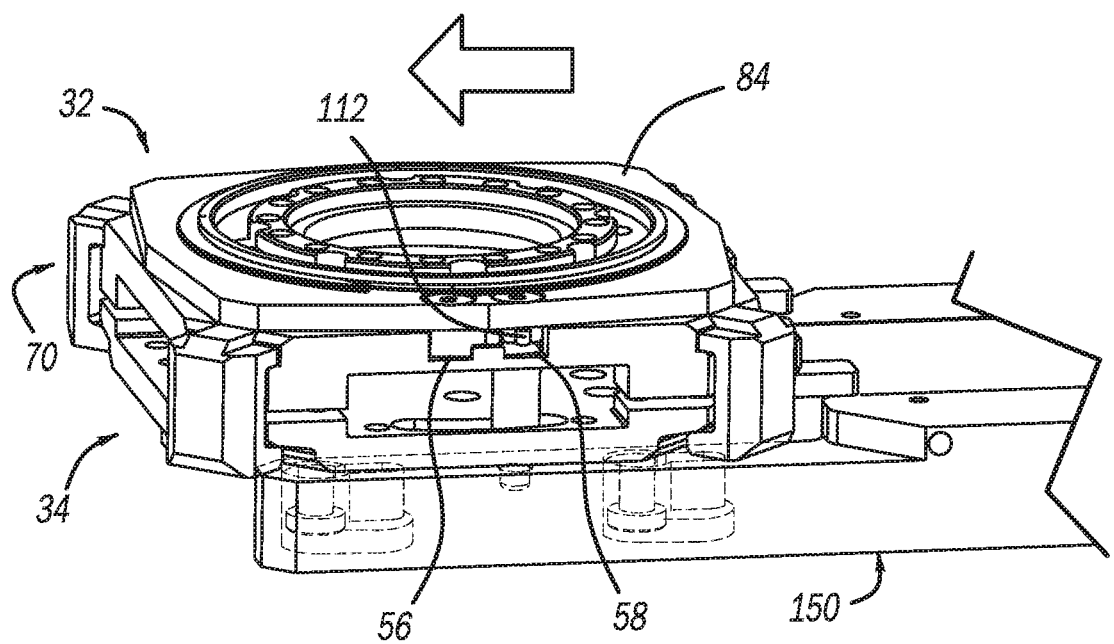
FIG. 10 is a perspective view like FIG. 9 illustrating the coupling process.
Figure 11:
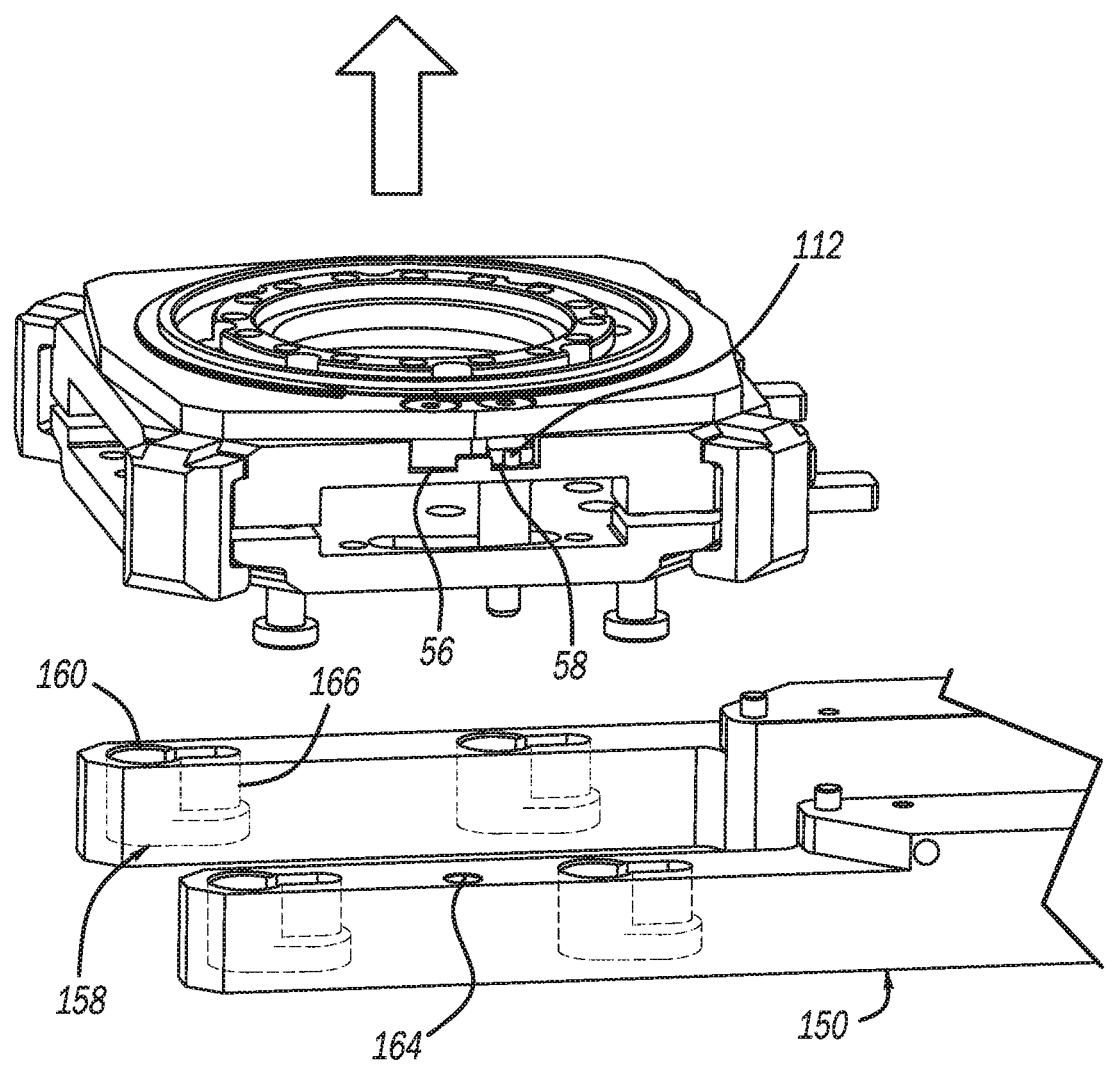
FIG. 11 is a perspective view with the tool halves coupled together.
Figure 12:
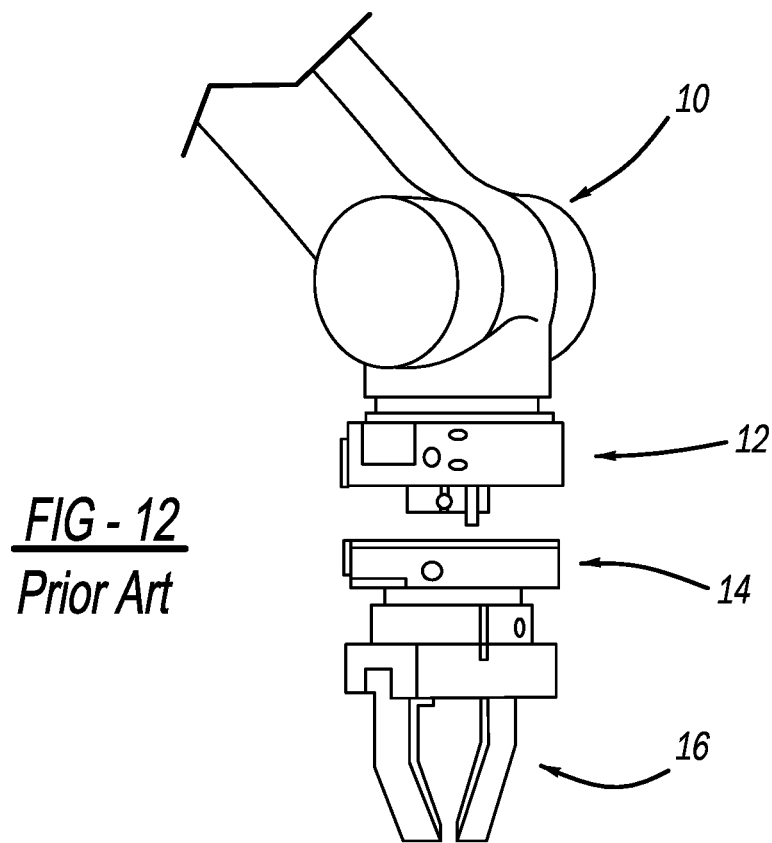
FIG. 12 is a perspective view of a prior art tool changer.
Figure 13:
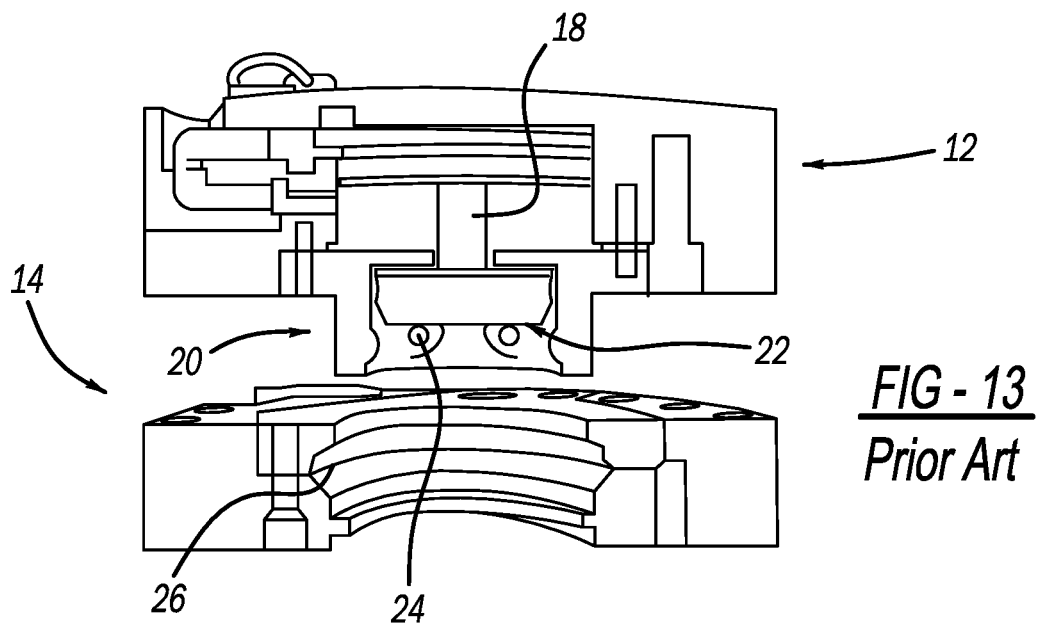
FIG. 13 is a cross-section view of FIG. 12.

The robot 10 continues to moves horizontally to finish the movement of the cam plate 84. In turn, the clasps 70 move into their secured locking position. Additionally, pin detent 112 moves to a position above the cutout 58 as illustrated in FIG. 10. As the robot 10 moves vertically away from the nest 150, as illustrated in FIG. 11, the pin 106 is moved away from the master half 32 by the spring 108. This moves the lock pin 74 into a locked condition with detent 112 engaged into slot 58 so that the master half 32 and tool half 34 are locked together.

To decouple the master half 32 and tool half 34, the robot 10 would position the tool changer in the nest 150. The robot 10 would be moved horizontally in the opposite direction to open/move the clasps to their released position. This enables the master half 32 to uncouple from the tool half 34. Thus, the robot 10 could be utilized to pick up an additional tool to do an additional function. The additional tool would have a tool half 34 as described above. Also, the next could move or both the nest and robot could move the tool halves 32, 34.

In the event, during operation, the tool changer would need the master half 32 separated from the tool half 34 manually, this could be done by a worker. The worker would push the pin 106 out of the cutout 58. This would enable the housing 104 to be moved by a screwdriver or the like to its released position releasing the clasps 70 from the tool half 34. Thus, upon release, the pin detent 116 would move into the cutout 56 and the master half 32 would be in a locked decoupled position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tool changer comprising:
   a master half and a tool half, the master half to be coupled with a robot, the tool half to be coupled with a tool;
   a first mating member on the master half;
   a second mating member on the tool half, the first and second mating members including a recess or a projection, respectively, for enabling the first and second mating members to mesh with one another;
   a securing mechanism for securing the master and tool halves with one another, the securing mechanism including a clasp moving between a release position and a grasping position, and a cam plate for moving the clasp between the release position and the grasping position, wherein when the clasp is the grasping position, the master half and the tool half are secured together with one another;
   a lock pin coupled with the cam plate, and
   when the master half and the tool half are to be secured together, the master half approaches the tool half, which is retained along with the coupled tool in a storage nest, and when the master half engages with the tool half for securement therewith, the lock pin couples with the storage nest, and after the lock pin is coupled, the master half is moved horizontally along with the tool half such that the lock pin pivots the cam plate and moves the clasp from its release position to its grasping position, wherein
   when the robot is moved vertically away from the nest, the lock pin moves into a locked position thereby locking the master half and the tool half together.

2. The tool changer of claim 1, wherein when the master and tool halves are unsecured with one another the tool half is retained in the storage nest.

3. The tool changer of claim 2, wherein the storage nest includes a bore for activating the lock pin.

4. The tool changer of claim 1, wherein the tool half includes posts to couple with the nest.

5. The tool changer of claim 1, wherein the securing mechanism includes a plurality of clasps.

6. The tool changer of claim 5, wherein each clasp includes a jaw and a cam pin.

7. The tool changer of claim 6, wherein each cam pin is received in a corresponding slot in the cam and wherein pivoting of the cam plate moves each cam pin in the corresponding slot, thereby moving the plurality of clasps between the released and grasping positions.

8. The tool changer of claim 7, wherein in the grasping position, the jaw of each of the plurality of clasps engages a respective shoulder for securing the master and tool halves together.

9. The tool changer of claim 1, wherein the tool half includes a slot to enable passage of the lock pin therethrough.

10. A tool changing station comprising:
a robot, at least one storage nest, and the tool changer according to claim 1.

11. The tool changing station of claim 10, wherein the at least one storage nest includes a bore for activating the lock pin.

12. The tool changing station of claim 10, wherein the tool half includes posts to couple with the at least one storage nest.

13. The tool changing station of claim 10, wherein the securing mechanism includes a plurality of clasps.

14. The tool changing station of claim 13, wherein each clasp includes a jaw and a cam pin.

15. The tool changer of claim 14, wherein each cam pin is received in a corresponding slot in the cam plate, and wherein pivoting of the cam plate moves each cam pin in the corresponding slot, thereby moving the plurality of clasps between the released and grasping positions.

16. The tool changer of claim 15, wherein in the grasping position, the jaw of each of the plurality of clasps engages a respective shoulder for securing the master and tool halves together.

* * * * *